(12) United States Patent
Miescher et al.

(10) Patent No.: US 7,861,905 B2
(45) Date of Patent: Jan. 4, 2011

(54) HAND-HELD FASTENER DRIVING TOOL

(75) Inventors: Stefan Miescher, Schaan (LI); Harald Fielitz, Buchs (CH); Walter Odoni, Planken (LI); Ulrich Schiestl, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 61 days.

(21) Appl. No.: 12/459,357

(22) Filed: Jun. 29, 2009

(65) Prior Publication Data
US 2010/0001032 A1 Jan. 7, 2010

(30) Foreign Application Priority Data
Jul. 3, 2008 (DE) ........................ 10 2008 040 131

(51) Int. Cl.
B27F 7/02 (2006.01)
(52) U.S. Cl. ....................... 227/7; 227/6; 227/8; 227/32
(58) Field of Classification Search ................. 227/6–8, 227/31–32, 109, 123, 13; 411/480
See application file for complete search history.

(56) References Cited
U.S. PATENT DOCUMENTS

| | | | | |
|---|---|---|---|---|
| 4,821,937 A | * | 4/1989 | Rafferty | 227/8 |
| 5,649,661 A | * | 7/1997 | Masuno et al. | 227/8 |
| 7,513,404 B2 | * | 4/2009 | Shkolnikov et al. | 227/8 |
| 2006/0022011 A1 | * | 2/2006 | Ceravalls Pujol et al. | 227/8 |
| 2007/0023472 A1 | * | 2/2007 | Schiestl | 227/132 |
| 2007/0199970 A1 | * | 8/2007 | Chen | 227/107 |

* cited by examiner

*Primary Examiner*—Andrew M Tecco
(74) *Attorney, Agent, or Firm*—Abelman, Frayne & Schwab

(57) ABSTRACT

A hand-held drive-in tool (10) has a trigger switch (19) for triggering a drive-in process by drive unit (30) that drives a drive-in ram (13), a press-on feeler (18) which is arranged so as to be displaceable at a muzzle (16), which can detect that the drive-in tool pressed against a workpiece, and which prevents the actuation of a drive-in process in its initial position (41) and enables actuation of its drive-in process in its switching position (43), a component feeler (17) displaceably arranged at the muzzle (16) and capable of being actuated independently from the press-on feeler (18) and preventing actuation of a drive-in process in its initial position (42) and enabling the actuation of the drive-in process in its switching position (44), the component feeler (17) detecting fitting of an auxiliary constructional component (110) to the muzzle (16), with a drive-in process being initiated by the trigger switch (19) only when the component feeler (17) and the press-on feeler (18) are both in their respective switching positions (43, 44).

7 Claims, 2 Drawing Sheets

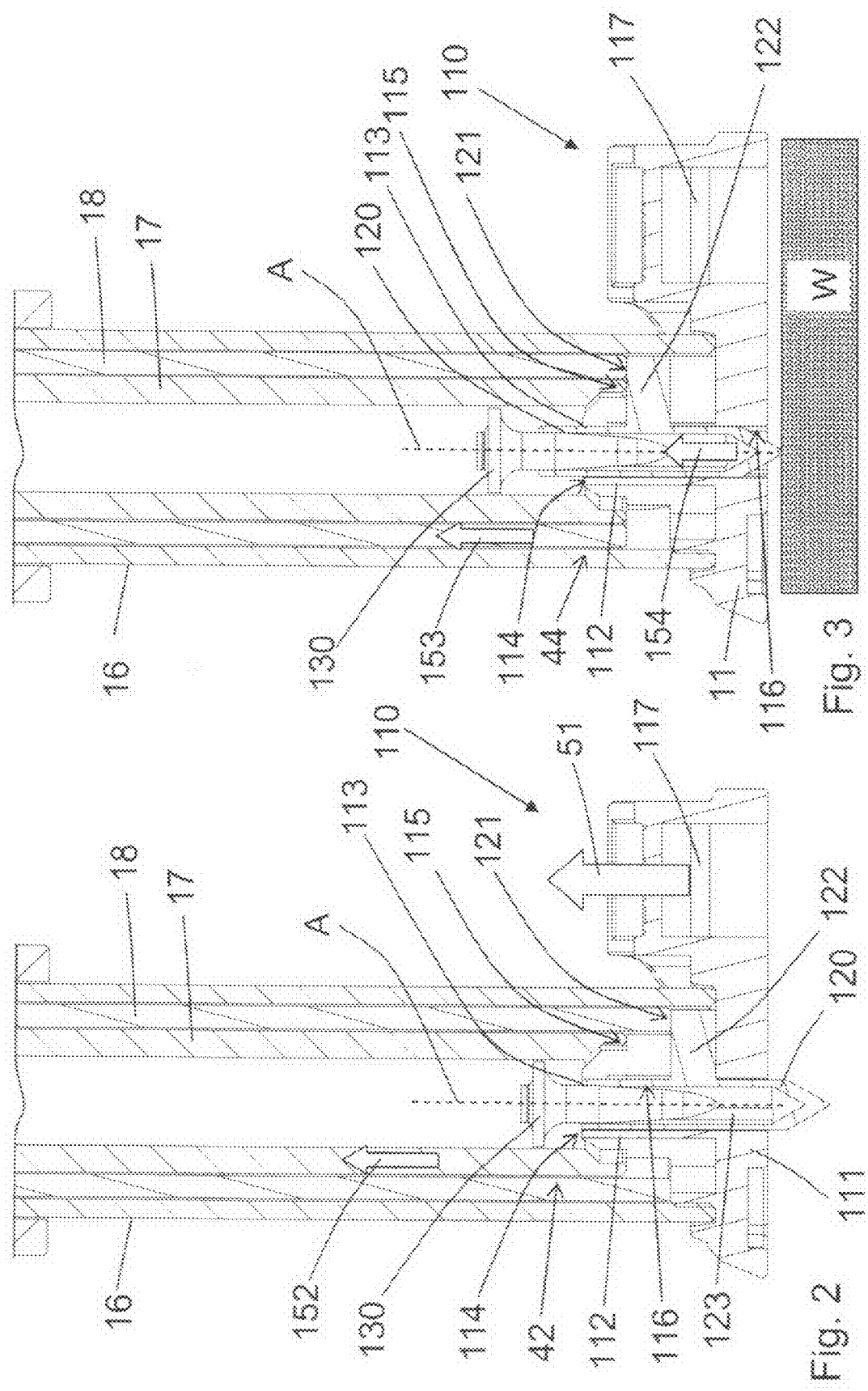

HAND-HELD FASTENER DRIVING TOOL

BACKGROUND OF THE INVENTION

1. Field of the Invention

The present invention relates to a hand-held fastener drive-in tool.

2. Description of the Prior Art

In hand-held fastener drive-in tools of the kind mentioned above, the driving energy is produced from, e.g., liquid or gaseous fuels or electrical energy stored, for example, in a battery. The drive-in tools have a displaceable drive-in ram with which fasteners can be driven into a workpiece.

German Publication DE 10 2005 000 089 A1 discloses a hand-held fastener drive-in tool having a drive unit for driving a drive-in ram which is displaceably mounted in a guide. The drive unit has at least one drive spring which can be tensioned by an electrically operated tensioning device. A press-on feeler that cooperates with switching means, is arranged at a muzzle of the fastener drive-in tool. The switching means is electrically connected to a control unit by a conductor. The switching means itself sends an electric signal to the control unit as soon as the press-on feeler is actuated in response to the fastener drive-in tool being pressed against a workpiece. This ensures that the fastener drive-in tool can only be actuated when it has been properly pressed against a workpiece or the like.

A fastener drive-in tool of this type is only conditionally suitable for mounting an auxiliary constructional component, e.g., a cable binder or formwork stop, on the muzzle prior to a drive-in process because, in this case, the switching means will be actuated already before pressing against a workpiece.

SUMMARY OF THE INVENTION

It is the object of the present invention to improve a fastener drive-in tool of the type mentioned above in such a way that auxiliary constructional components can be fitted to the muzzle and detected and in which it is possible at the same time to detect when the device is pressed against a workpiece or a constructional component.

This and other objects of the present invention which will become apparent hereinafter are achieved by providing a drive-in tool in which a component feeler is displaceably arranged on the muzzle, is actuated independently from the press-on feeler, prevents actuation of a drive-in process in its initial position, and enables actuation of a drive-in process in its switching position. The component feeler permits to detect the fitting of an auxiliary constructional component to the muzzle, with a drive-in process being initiated by an actuation switch only when the component feeler and the press-on feeler are both in their respective switching positions.

On one hand, this makes it possible for the fastener drive-in tool to detect that an auxiliary constructional component has been properly fitted to the muzzle. On the other hand, subsequent pressing of the fastener drive-in tool against a workpiece or constructional component is detected, whereby pressing against a workpiece is detected by the press-on feeler through or via the auxiliary constructional component. The auxiliary constructional component can, for example, be formed as a formwork stop, spacer, reinforcement holder, pipe clamp, holding element, angle element, ceiling hanger, or the like.

In an advantageous manner, the component feeler can be moved from its initial position into its switching position by an actuating contour of the auxiliary constructional component so as to ensure a reliable detection of the auxiliary constructional component when correctly fitted to the muzzle.

It is further advantageous when the press-on feeler can be moved from its initial position into its switching position by a displaceably guided sensing element of the auxiliary constructional component. The press-on movement can be conveyed to the press-on feeler of the fastener drive-in tool in a simple manner by the displaceable sensing element.

It is also advantageous when the component feeler and the press-on feeler are sleeve-shaped, both of them being guided in the muzzle concentric to one another. A functionally simple and compact construction is achieved in this way.

In an advantageous further development, the component feeler is arranged inside the second press-on feeler and comprises a drive-in channel for fasteners. This makes it possible to arrange the actuating contour of the auxiliary constructional component in the area of its guide sleeve for the fastener and which is usually inserted into the muzzle to secure the auxiliary constructional component to the muzzle.

In an advantageous manner, the drive-in process can be triggered by the trigger switch only when the component feeler is moved into its switching position at least 0.3 seconds before the press-on feeler. This step makes it appreciably more difficult to tamper with or bypass the safety device with the press-on feeler and component feeler.

Further, it is advantageous when an electric control unit is provided, and a first electric switch is associated with the component feeler, and a second electric switch is associated with the press-on feeler. The two switches are connected to the control unit, and the control unit monitors the sequence and the time interval between the switching signals of the first switch and second switch. The monitoring of the sequence makes it highly difficult to circumvent the safety system.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments when read with reference to the accompanying drawings.

BRIEF DESCRIPTION OF THE DRAWINGS:

The drawings show:

FIG. 2 a cross-sectional view of an auxiliary constructional component at a muzzle of the fastener drive-in tool according to FIG. 1; and FIG. 3 a cross-sectional view of the auxiliary constructional component shown in FIG. 2 at the muzzle of the fastener drive-in tool and positioned against a workpiece.

DETAILED DESCRIPTION OF THE PREFERRED EMBODIMENT

Figure 1:
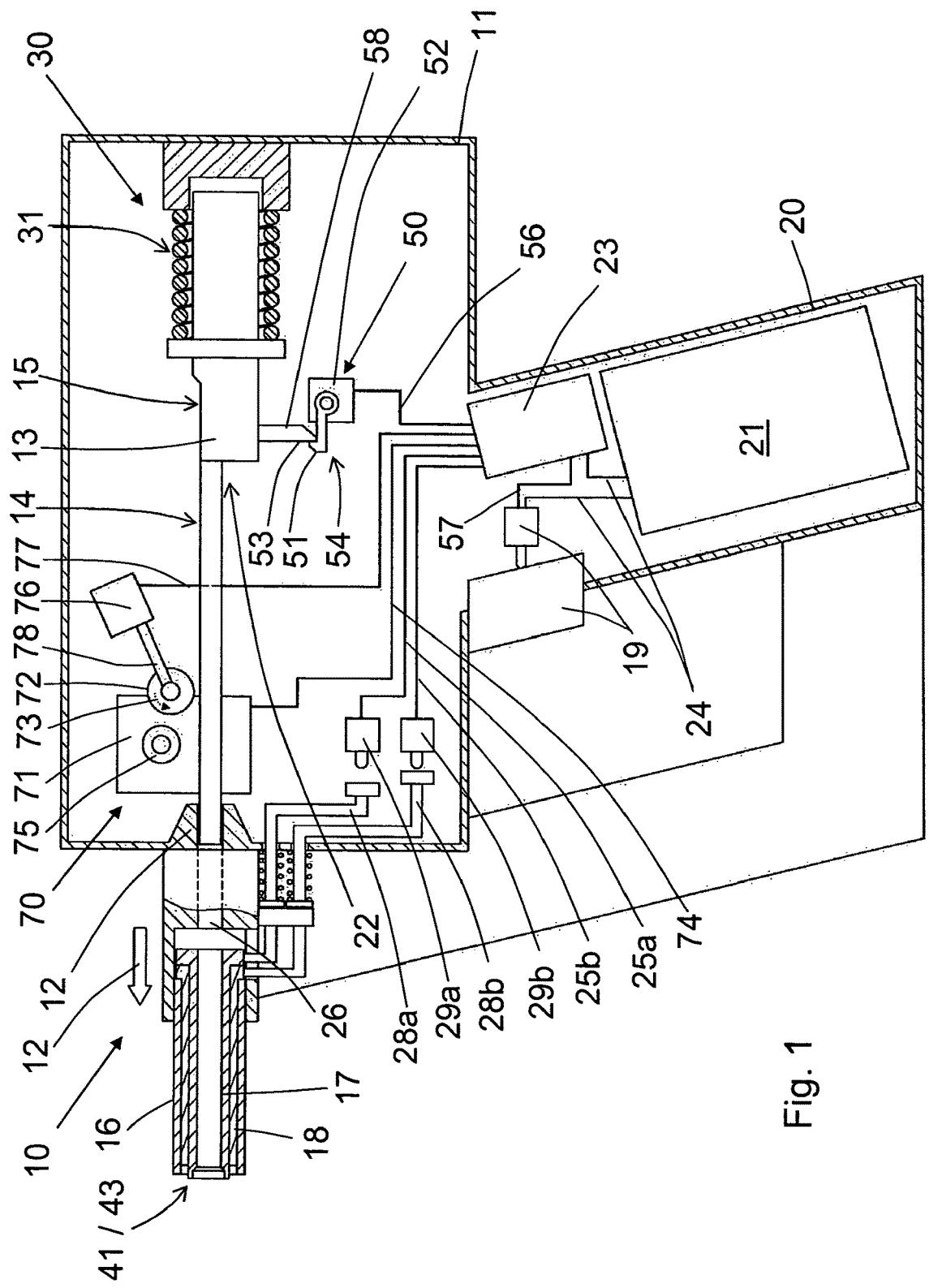
FIG. 1 a longitudinal cross-sectional view of a fastener drive-in tool according to the present invention in its initial position.

A fastener drive-in tool according to the present invention which is shown in FIGS. 1 and 2, is formed as an electrically operated fastener drive-in tool 10 which is outfitted with a self-contained power supply. The fastener drive-in tool 10 has a housing 11 and a drive unit designated in its entirety by a reference numeral 30 and located in the housing 11 for driving a drive-in ram 13 which is displaceably guided in a guide 12. The drive-in ram 13 has a drive-in portion 14 for a fastener 130 and a head portion 15.

Adjoining the end of the guide 12 extending in the drive-in direction 27 is a muzzle 16 having a guide channel 26 extending coaxially to the guide.

The drive unit 30 contains a driving spring 31 which is supported at one of its ends indirectly against the housing 11 and the other end of which engages the head portion 15 of the drive-in ram 13.

In the initial position 22 of the drive-in ram 13 shown in FIG. 1, the drive-in ram 13 is elastically preloaded against the driving spring 31.

In the initial position 22, the drive-in ram 13 is held by a locking device, which is designated in its entirety by a reference numeral 50, has a pawl 51 that engages at a locking face 53 of a projection 58 of the drive-in ram 13 in a locking position 54 (see FIG. 1), and holds this drive-in ram 13 against the force of the drive spring 31. The pawl 51 is supported at an actuating motor 52 and can be moved by the latter into a release position, not shown in FIG. 1, as will be described more fully further below. The actuating motor 52 is connected to an electric control unit 23 by a first electric control line 56.

The fastener drive-in tool 10 also has a handle 20 on which a trigger switch 19 is arranged for actuating a drive-in process with the fastener drive-in tool 10. Further, a power supply, which is designated in its entirety by a reference numeral 21 and which supplies the fastener drive-in tool 10 with electrical power, is arranged in the handle 20. In the present case, the power supply 21 contains at least one battery, e.g., a Ni-MH battery or Lithium-ion battery. The power supply 21 is connected by electric supply lines 24 to the control unit 23 and to the trigger switch 19. Further, the control unit 23 is connected to the trigger switch 19 by a switch line 57.

A press-on feeler 18 and a component feeler 17, both of which are formed so as to be sleeve-shaped and which are displaceably guided in an expanded portion of the guide channel 26 of the muzzle 16, are arranged at the muzzle 16 of the fastener drive-in tool 10. In FIG. 1, the component feeler 17 and the press-on feeler 18 are shown in their respective initial positions 41, 42. The internal component feeler 17, which comprises a drive-in channel for fasteners, is connected to first actuating means 28a which is designed to actuate a first electric switch 29a when the component feeler 17 is moved in a direction opposite to the setting direction 27 into its switching position 42 (see FIG. 2).

The press-on feeler 18 which is arranged between the component feeler 17 and the muzzle 16, is connected to a second actuating element 28b which is designed to actuate a second electric switch 29b when the press-on feeler 18 is moved in a direction opposite the setting direction 27 until its switching position 44 is reached (see FIG. 3). An actuation of a setting process with the trigger switch 19 is only possible when both switches 29a, 29b are actuated in the sequence of, first, the component feeler 17 and, second, the press-on feeler 18. The first switch 29a must be actuated first, and the second switch 29b must then be actuated after a delay of at least 0.3 seconds.

The switches 29a, 29b, are electrically connected to the control unit 23 by a switch line 25.

Further, a tensioning device, designated in its entirety by a reference numeral 70, is provided in the fastener drive-in tool 10. This tensioning device 70 includes a motor 71 which drives a drive roller 72. The motor 71 is electrically connected to the control unit 23 by a second control line 74 and can be set in operation, e.g., when the drive-in ram 13 is in its end position in the drive-in direction 27 or when the fastener drive-in tool is lifted again from the workpiece W. The motor 71 has output means 75, such as a driven wheel, which can be coupled to the drive roller 72. The drive roller 72 is rotatably mounted on a longitudinally displaceable actuating arm 78 of actuation means 76 formed as a solenoid. The actuation means 76 is connected to the control unit 23 by an actuating line 77. During operation, the drive roller 72 rotates in the direction of arrow 73 indicated by a dash line.

When the fastener drive-in tool 10 is set in operation by a main switch, not shown, the control unit 23 initially ensures that the drive-in ram 13 is located in its initial position 22 shown in FIG. 1. If this is not the case, the drive roller 72 is advanced by the actuating means 76 to the output means 75 which has already been set in rotation by the motor 71 and engages the latter. At the same time, the drive roller 72 engages the drive-in ram 13 so that the latter is displaced in direction of the drive unit 30 by the drive roller 72 rotating in the direction indicated by arrow 73. Thereby, the drive spring 31 of the drive unit 30 is tensioned. When the drive-in ram 13 has reached its initial position 22, the pawl 51 of the locking device 50 engages in the locking face 53 at the drive-in ram 13 and holds it in the initial position 22. The motor 71 can then be switched off by the control unit 23, and the actuating means 76, which is also controlled by the control unit 23, moves the drive roller 72, from its engaged position with the output means 75 and drive-in ram 13 to its disengaged position.

To return the drive-in ram 13 and to preload the drive spring 31, the tensioning device 70 is actuated at the end of the drive-in process by the control unit 23 when the fastener drive-in tool 10 is lifted again off the workpiece W. For this purpose, at least one of the switches 29a, 29b supplies a signal to the control unit 23. The drive-in ram 13 is moved by the tensioning device 70 against the drive spring 31 of the drive unit 30, as was already described, and the drive spring 31 is preloaded again until the pawl 51 engages again, in its locking position 54, the locking face 53 at the drive-in ram 13.

FIGS. 2 and 3 show an auxiliary constructional component 110 which is formed as a cable fastener or cable binder and which is arranged at the muzzle 16 of the fastener drive-in tool 10 described above. The auxiliary constructional component 110 has a base 111 at which a tie guide 117 for a cable tie, not shown in the drawings, is arranged laterally of the base 111 for fastening cables. A sleeve-shaped guide section 112 that has a through-opening 113 surrounded by an abutment 114 for a fastener 130, projects from the base 111. An actuating contour 115 is arranged at the guide section 112. As can be seen in FIGS. 2 and 3, the component feeler 17 at the muzzle 16 of the fastener drive-in tool 10 can be actuated in direction of the second arrow 152 by the actuating contour 115 when the auxiliary constructional component 110 is fitted to the muzzle 16 in direction of the first arrow 151 (see FIG. 2). The actuation of the component feeler 17 of the fastener drive-in tool 10 until it reaches its initial position 42 sets the control unit 23 of the fastener drive-in tool 10 in the standby state by actuating the first switch 29a.

Also arranged in the guide section 112 is a guide 116 for a sensing element 120 which is formed as an elongated hollow pin. The sensing element 120 has an axially extending receiving space 123 in which the fastener 130 is inserted and where it is held by frictional engagement. The sensing element 120 has three projections 122 which project radially from the central pin body and which are arranged at uniform distances from one another. Actuating surfaces 121 which actuate the press-on feeler 18 in the muzzle 16 of the fastener drive-in tool 10, are arranged, as is shown in FIG. 4, on the sides of the projections 122 facing in the direction of mounting of the auxiliary constructional component 110 on the muzzle 16.

When the fastener drive-in tool 10 is pressed against a workpiece W with the auxiliary constructional component 110 mounted on the muzzle 16, the sensing element 120 is displaced from its initial state shown in FIG. 2 in direction of the third arrow 153 toward the muzzle 16. As a result, the actuating surfaces 121 of the projections 122 move the press-on feeler 18 in the direction indicated by the fourth arrow 154 into the muzzle 16 (see FIG. 3) until it reaches its switching position 44. By moving the press-on feeler 18 into its switching position 44, the second switch 29b is actuated, and the control unit 23 of the fastener drive-in tool 10 is ready to operate so that only the trigger switch 19 of the fastener drive-in tool 10 needs to be actuated to initiate a setting process. However, this operation-ready state is only initiated by the control unit 23 when the first switch 29a and second switch 29b are actuated with a delay of at least 0.3 seconds and in the sequence of first switch 29a being actuated first and second switch 29b being actuated second. This rules out any tampering with the safety device that includes the press-on feeler 18 and component feeler 17. When the trigger switch 19 is actuated by the user, the locking device 50 is moved into its release position (not shown in the drawings) by the control unit 23, whereby the pawl 51 is lifted from the locking face 53 at the drive-in ram 13 by the actuating motor 52. The drive-in ram 13 is then moved in the drive-in direction 27 by the drive spring 31 of the drive unit 30 and a fastener 130 is driven into the workpiece W.

Of course, the auxiliary constructional component 110 can also be formed as a formwork stop, spacer, reinforcement holder, pipe clamp, holding element, angle element, ceiling hanger, or the like.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A drive-in tool for driving a fastener in a workpiece (W) and adapted to be fitted with an auxiliary constructional component (110), the drive-in tool comprising a drive-in ram (13) for driving the fastener in the workpiece (W); a drive unit (30) for driving the drive-in ram (13); a trigger switch (19) for actuating a drive-in process by actuating the drive unit (30); a muzzle (16); a press-on filler (18) displaceably supported at the muzzle (16) for detecting a press-on state of the drive-in tool (10) against the workpiece (W) and having an initial position (41) in which actuation of the drive-in process is prevented, and a switching position (43) in which the actuation of the drive-in process is possible; and a component feeler (17) likewise displaceably supported at the muzzle (16) and actuatable independently of actuation of the press-on feeler (18) and having an initial position (42) in which the actuation of the drive-in process is prevented, and a switching position (44) in which the actuation of the drive-in process is possible, the component feeler (17) being displaceable in the switching position (44) thereof upon the auxiliary constructional component (110) being fitted to the muzzle (16), and the trigger switch (19) actuating the drive-in process only when both the component feeler (17) and the press-on feeler (18) are displaced in respective switching positions (43, 44) thereof.

2. A fastener drive-in tool according to claim 1, wherein the component feeler (17) is moved from the initial position (42) thereof into the switching position (44) thereof by an actuating contour (115) of the auxiliary constructional component (110).

3. A fastener drive-in tool according to claim 1, wherein the press-on feeler (18) is moved from its initial position (41) into its switching position (43) by a displaceably guided sensing element (120) of the auxiliary constructional component (110).

4. A fastener drive-in tool according to claim 1, wherein the component feeler (17) and the press-on feeler (18) are sleeve-shaped and both being guided in the muzzle (16) concentric to one another.

5. A fastener drive-in tool according to claim 4, wherein the component feeler (17) is arranged inside the press-on feeler (18) and comprises a drive-in channel for fasteners (130).

6. A fastener drive-in tool according to claim 1, wherein the drive-in process can be actuated by the trigger switch (19) only when the component feeler (17) is moved into its switching position (43) at least 0.3 seconds before the press-on feeler (18) is moved.

7. A fastener drive-in tool according to claim 1, further comprising an electric control unit (23), and a first electric switch (29a) associated with the component feeler (17), and a second electric switch (29b) associated with the press-on feeler (18), wherein the two switches (29a, 29b) are connected to the control unit (23), and wherein the control unit (23) monitors sequence of and a time interval between the switching signals of the first switch (29a) and second switch (29b).

* * * * *